Dec. 20, 1960  L. F. ECKERT, JR  2,964,969
STEM ASSEMBLY FOR VALVES
Filed Jan. 11, 1960
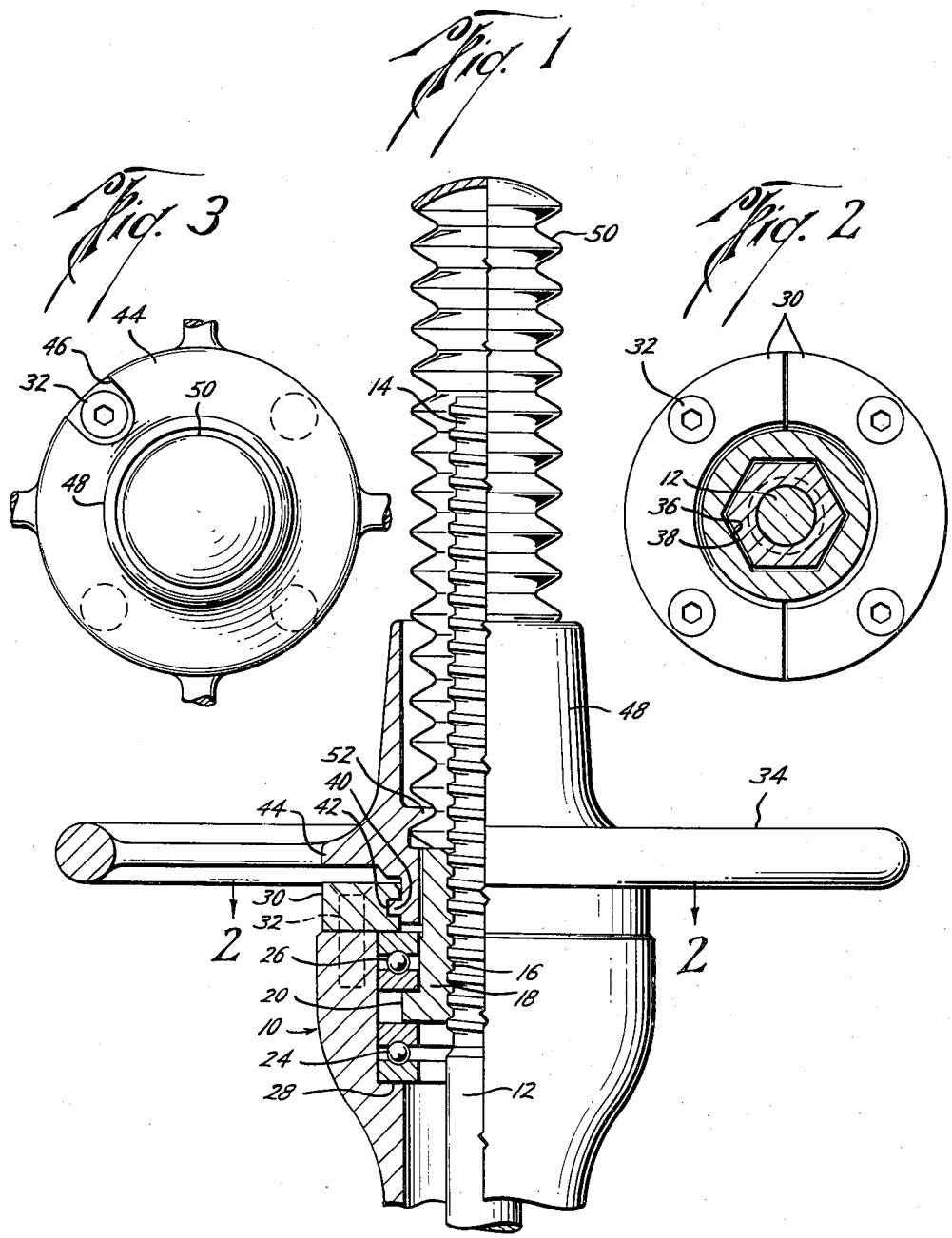
Louis F. Eckert, Jr.
INVENTOR.
BY Russell E. Schloff
ATTORNEY United States Patent Office 2,964,969
Patented Dec. 20, 1960

2,964,969

STEM ASSEMBLY FOR VALVES

Louis F. Eckert, Jr., Houston, Tex., assignor to ACF Industries Incorporated, New York, N.Y., a corporation of New Jersey Filed Jan. 11, 1960, Ser. No. 1,719

4 Claims. (Cl. 74—509)

This invention relates to a new and an improved actuating assembly for rising stem valves.

In rising stem valves, the outer portion of the stem is provided with threads which engage with the threads of a stem nut. Rotation of the stem nut results in non-rotative reciprocatory movement of the stem thereby raising or lowering a valve member which is attached to the inner portion of the stem. One method of rotating the stem nut is to attach a handwheel thereto. A common method of attaching the handwheel to the stem nut is to provide the hub of the handwheel with a portion which mates with the outer surface of the stem nut and key the stem nut and handwheel together. In such case, the extreme outer end of the stem nut is usually provided with machine threads and a lock nut is secured thereto. In the present invention, the outer portion of the handwheel is provided with an indicator shield making it difficult to have a lock nut retain the handwheel. Accordingly, the stem nut is provided with a cast male hub member and the handwheel is provided with a mating female hub member which telescopically fits over the stem nut. To lock the handwheel to the valve, the hub of the handwheel is provided with an annular tongue and a two-piece bearing plate, provided with an inner annular groove, engages with the tongue of the handwheel. After the bearing retainer plate is engaged with the handwheel, it is attached by screws to the top of the bonnet of the valve. A flange on the handwheel covers the screws, and the screws can be inserted or removed only by the positioning of a slot over the screw. With such construction, the handwheel can not be removed unless the handwheel is rotated so that slot is progressively positioned over each screw.

The assembly is so constructed that the bearing load is not transmitted to the handwheel, but is carried by the bearing retainer plate. It is not necessary to maintain close tolerances inasmuch as the handwheel floats loose and the connection between the handwheel and stem nut can be as cast.

The principal object of this invention is to provide a simple construction for attaching a one-piece handwheel having an integral indicator housing to the bonnet of a valve.

It is another object to provide a handwheel and bonnet assembly in which the handwheel can not work loose.

It is a further object to provide a handwheel and bonnet assembly which is tamper-proof.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawings, forming a part of the specification, wherein:

Fig. 1 is a front elevational view of the device of this invention, one half of said view is in section to show inner details.

Fig. 2 is a sectional view taken on lines 2—2 of Fig. 1.

Fig 3 is a top plan view of the assembly shown in Fig. 1.

Referring now to the drawings, Fig. 1 shows the top section or bonnet 10 of a valve to which this invention is applied. The valve has a non-rotating rising stem 12 to which a valve member (not shown) is attached. As the stem 12 reciprocates, the valve member correspondingly moves to operate the valve. The outer portion of the stem 12 is provided with male threads 14 which interengage with female threads 16 of a stem nut 18. Rotative movement of the stem nut 18 causes the stem 12 to reciprocate. To accommodate the thrust load developed in moving the stem, the stem nut 18 is provided with an external cylindrical shoulder 20 about its lower end which is interposed between bearings 24 and 26. The inner bearing 24 abuts against a shoulder 28 in the passage of the bonnet 10. The outer bearing 26 is secured by bearing retainer plates 30—30 which are attached to the top of the bonnet 10 by a multiplicity of flat head screws 32. The load produced by the outward movement of the stem is transmitted through the shoulder 20, bearing 24 and absorbed by the shoulder 28. The thrust resulting from the inward movement of the stem is transmitted by shoulder 20 through bearing 26 and is absorbed by bearing retainer plates 30—30.

In order to turn the stem nut 18, a handwheel 34 is provided. The hub of the handwheel 34 is provided with a female hexagonal portion 36 which mates with a male hexagonal portion 38 of the stem nut 18. To attach the handwheel 34 to the stem nut 18, the hexagonal portion 36 of the hub of the handwheel is slipped over the hexagonal portion 38 of the stem nut. The fit between the stem nut 18 and handwheel 34 can be fairly loose and the hexagonal portions 36 and 38 utilized as cast. The outer surface of the hub of the handwheel 34 is provided with an annular tongue 40 which engages with an annular groove 42 of the retainer plates 30—30. After the two retainer plates 30—30 are encompassed about the hub of the handwheel 34 with the tongue 40 engaging with the annular groove 32, the bearing retainer plates 30—30 are attached to the top of the bonnet 10 as previously mentioned by the screws 32. The hub of the handwheel is provided with a flange 44 which overlies the screws 32. A slot 46 in the flange 44 provides an entry for insertion and removal of screws 32.

The hub of the handwheel extends outwardly of the valve forming a housing or shield 48 for a stem protector and indicator 50 as is fully disclosed in Anderson et al. co-pending application Serial No. 731,251. The shield 48 is of sufficient height so that when the stem 12 is fully retracted, the indicator 50 will be within the shield 48. Located near the bottom of the inner wall of the shield 48 there is an annular protuberance 52 over which the bottom end of the indicator 50 is frictionally engaged.

Valves being in isolated locations are oftentimes subject to vandalism. One common form of this vandalism is to remove the handwheel. If, in the present case, a lock is provided for the handwheel so it can not be rotated, the handwheel can not be removed. Removal of the handwheel requires that the retainer plate screws 32 be extracted and this can not be accomplished without rotating the handwheel until the screw slot 46 is stationed over the screws, see Fig. 3. Moreover, if flat head screws having recessed hexagonal sockets are used, a special wrench is required to remove the screws. Also with such construction, it is not readily apparent how the handwheel is attached.

As can be seen in the foregoing description, the invention provides a simple means of attaching a one-piece handwheel with an integral indicator housing to the bonnet of a rising stem valve.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. Actuating means for a valve having a bonnet and a non-rotative, rising, threaded stem, said means comprising: a bonnet having a central passage, a non-rotative, rising stem, the outer portion of said stem provided with threads, an internally threaded stem nut threadedly engaged with the threads of said stem, said stem nut having an external cylindrical shoulder about its lower end, a pair of thrust bearings positioned one on either side of said shoulder, a shoulder in the passage of the bonnet retaining one of said bearings, the outer surface of the upper end of said stem nut having a polygonal configuration, a handwheel having a hub with a passage provided with a mating polygonal configuration, said polygonal configuration of the handwheel telescoping over the polygonal portion of the stem nut, the external surface of the hub provided with an annular tongue, a bearing retainer plate having a passage therethrough and an annular groove in said passage mating with the annular tongue of the handwheel, the bearing retainer plate attached to the top of the bonnet securing the handwheel in position and serving as a load carrier for the other bearing.

2. Actuating means for a valve having a bonnet and a non-rotative, rising, threaded stem, said means comprising: a bonnet having a central passage, a non-rotative rising stem, the outer portion of said stem provided with threads, an internally threaded stem nut threadedly engaged with the threads of said stem, said stem nut having an external cylindrical shoulder about its lower end, a pair of thrust bearings positioned one on either side of said shoulder, a shoulder in the passage of the bonnet retaining one of said bearings, the outer surface of the upper end of said stem nut having a hexagonal configuration, a handwheel having a hub with a passage provided with a hexagonal configuration, said hexagonal configuration of the handwheel telescoping over the hexagonal portion of the stem nut, the external surface of the of the hub provided with an annular tongue, a two-piece bearing retainer plate having a passage therethrough and an annular groove in said passage mating with the annular tongue of the handwheel, the bearing retainer plate attached to the top of the bonnet securing the handwheel in position and serving as a load carried for the other bearing.

3. Actuating means for a valve having a bonnet and a non-rotative, rising, threaded stem, said means comprising: a bonnet having a central passage, a non-rotative, rising stem, the outer portion of said stem provided with threads, an internally threaded stem nut threadedly engaged with the threads of said stem, said stem nut having an external cylindrical shoulder about its lower end, a pair of thrust bearings positioned one on either side of said shoulder, a shoulder in the passage of the bonnet retaining one of said bearings, the outer surface of the upper end of said stem nut having a hexagonal configuration, a handwheel having a hub with a passage provided with a hexagonal configuration, said hexagonal configuration of the handwheel telescoping over the hexagonal portion of the stem nut, the external surface of the hub provided with an annular tongue, a two-piece bearing retainer plate having a passage therethrough and an annular groove in said passage mating with the annular tongue of the handwheel, the bearing retainer plate attached to the top of the bonnet by a multiplicity of screws, securing the handwheel in position and serving as a load carrier for the other bearing, a flange on the hub of the handwheel overlying said screws, a slot in the flange to provide an entry for the insertion and removal of said screws.

4. Actuating means for a valve having a bonnet and a non-rotative, rising, threaded stem, said means comprising: a bonnet having a central passage, a non-rotative, rising stem, the outer portion of said stem provided with threads, an internally threaded stem nut threadedly engaged with the threads of said stem, said stem nut having an external cylindrical shoulder about its lower end, a pair of thrust bearings positioned one on either side of said shoulder, a shoulder in the passage of the bonnet retaining one of said bearings, the outer surface of the upper end of said stem nut having a hexagonal configuration, a handwheel having a hub with a passage provided with a hexagonal configuration, said hexagonal configuration of the handwheel telescoping over the hexagonal portion of the stem nut, the outer end of said handwheel provided with a housing to receive a stem protector and indicator, the external surface of the hub provided with an annular tongue, a two-piece bearing retainer plate having a passage therethrough and an annular groove in said passage mating with the annular tongue of the handwheel, the bearing retainer plate attached to the top of the bonnet by a multiplicity of screws securing the handwheel in position and serving as a load carrier for the other bearing, a flange on the hub of the handwheel overlying said screws, a slot in the flange to provide an entry for the insertion and removal of said screws.

References Cited in the file of this patent

UNITED STATES PATENTS

| | | |
|---|---|---|
| 1,664,694 | Lovvorn | Apr. 3, 1928 |
| 1,693,407 | Shand | Nov. 27, 1928 |
| 2,358,785 | Blizard | Sept. 26, 1944 |
| 2,674,903 | Doster | Apr. 13, 1954 |
| 2,937,036 | Anderson et al. | Apr. 26, 1960 |